(12) United States Patent
Hundemer

(10) Patent No.: US 9,997,204 B2
(45) Date of Patent: *Jun. 12, 2018

(54) CLIP SCHEDULING WITH CONFLICT ALERT

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/484,047

(22) Filed: Apr. 10, 2017

(65) Prior Publication Data

US 2017/0221525 A1 Aug. 3, 2017

Related U.S. Application Data

(63) Continuation of application No. 14/209,190, filed on Mar. 13, 2014, now Pat. No. 9,661,369.

(51) Int. Cl.
*H04N 9/80* (2006.01)
*G11B 27/34* (2006.01)
(Continued)

(52) U.S. Cl.
CPC ............ *G11B 27/34* (2013.01); *G11B 27/031* (2013.01); *H04N 9/87* (2013.01); *H04N 9/89* (2013.01)

(58) Field of Classification Search
CPC ............ G06F 17/241; G06F 17/30038; H04N 21/23418; H04N 21/84; H04N 21/854;
(Continued)

(56) References Cited

U.S. PATENT DOCUMENTS 6,049,332 A * 4/2000 Boetje ............... G11B 27/105
345/6
2003/0001880 A1 1/2003 Holtz
(Continued)

OTHER PUBLICATIONS

Office Action dated Oct. 21, 2015 issued in U.S. Appl. No. 14/208,898.
(Continued)

*Primary Examiner* — William Tran
(74) *Attorney, Agent, or Firm* — McDonnell Boehnen Hulbert & Berghoff LLP

(57) ABSTRACT

An example method involves: accessing a first list including ordered clip identifiers $C_1 \ldots C_n$; accessing a second list including ordered player identifiers $P_1 \ldots P_x$; determining that an identifier $C_m$ of the identifiers $C_1 \ldots C_n$ is restricted to being assigned an identifier $P_z$ from the identifiers $P_1 \ldots P_x$; making a first determination that an identifier $C_p$ is a next one of the identifiers $C_1 \ldots C_n$ after the identifier $C_m$ to have a player-identifier assignment-restriction; responsive to making the first determination, (i) determining that the identifier $C_p$ is restricted to being assigned an identifier $P_y$ from the identifiers $P_1 \ldots P_x$, and (ii) matching with each identifier $C_{m+1} \ldots C_p$ in reverse order a respective one of the identifiers $P_1 \ldots P_x$ selected in a reverse ordered and looping fashion starting with the identifier $P_y$; making a second determination that the identifier $C_{m+1}$ has been matched with the player identifier $P_z$; and responsive to making the second determination, causing an alert to be output.

16 Claims, 10 Drawing Sheets

(51) Int. Cl.
*H04N 9/87* (2006.01)
*G11B 27/031* (2006.01)
*H04N 9/89* (2006.01)

(58) Field of Classification Search
CPC .............. H04N 21/23424; G11B 27/28; G11B 27/036; G11B 27/19
USPC ........................................................ 386/241
See application file for complete search history.

(56) References Cited

U.S. PATENT DOCUMENTS

| | | | |
|---|---|---|---|
| 2003/0156824 A1* | 8/2003 | Lu ........................ | G11B 27/105 386/230 |
| 2008/0034093 A1 | 2/2008 | Sutou | |
| 2008/0244605 A1* | 10/2008 | Bennington ........... | G06Q 10/06 705/7.14 |
| 2014/0109154 A1 | 4/2014 | Basse et al. | |
| 2014/0258450 A1* | 9/2014 | Suryanarayanan . | H04L 67/1097 709/217 |
| 2015/0160977 A1* | 6/2015 | Accapadia ............ | G06F 9/5083 718/104 |
| 2015/0294025 A1 | 10/2015 | Wellen et al. | |

OTHER PUBLICATIONS

Office Action dated Oct. 21, 2015 issued in U.S. Appl. No. 14/208,933.
Hundemer, Hank J., U.S. Appl. No. 14/208,898, filed Mar. 13, 2014.
Hundemer, Hank J., U.S. Appl. No. 14/208,933, filed Mar. 13, 2014.
Final Office Action dated May 4, 2016 issued in U.S. Appl. No. 14/208,933.
Final Office Action dated Jun. 6, 2016 issued in U.S. Appl. No. 14/208,898.

* cited by examiner

| Title | Clip Identifier | Player Identifier | Player Identifier Assignment Restriction |
|---|---|---|---|
| Clip 1 | $C_1$ | | $P_1$ |
| Clip 2 | $C_2$ | $(P_1)$ | |
| Clip 3 | $C_3$ | $(P_2)$ | |
| Clip 4 | $C_4$ | $(P_3)$ | |
| Clip 5 | $C_5$ | $(P_1)$ | |
| Commercial Break Marker | | | |
| Clip 6 | $C_6$ | $(P_2)$ | |
| Clip 7 | $C_7$ | $(P_3)$ | $P_3$ |
| Clip 8 | $C_8$ | | |
| Clip 9 | $C_9$ | | |
| Commercial Break Marker | | | |
| Clip 10 | $C_{10}$ | | |
| Clip 11 | $C_{11}$ | | |
| Clip 12 | $C_{12}$ | | |
| Clip 13 | $C_{13}$ | | |
| Clip 14 | $C_{14}$ | | |
| Clip 15 | $C_{15}$ | | $P_1$ |

Block A: Clips 1-5
Block B: Clips 6-9
Block C: Clips 10-15

| Title | Clip Identifier | Player Identifier | Player Identifier Assignment Restriction |
|---|---|---|---|
| Clip 1 | $C_1$ | | $P_3$ |
| Clip 2 | $C_2$ | $(P_1)$ | |
| Clip 3 | $C_3$ | $(P_2)$ | |
| Clip 4 | $C_4$ | $(P_3)$ | |
| Clip 5 | $C_5$ | $(P_1)$ | |
| Commercial Break Marker | | | |
| Clip 6 | $C_6$ | $(P_2)$ | |
| Clip 7 | $C_7$ | $(P_3)$ | $P_3$ |
| Clip 8 | $C_8$ | $(P_3)$ | |
| Clip 9 | $C_9$ | $(P_1)$ | |
| Commercial Break Marker | | | |
| Clip 10 | $C_{10}$ | $(P_2)$ | |
| Clip 11 | $C_{11}$ | $(P_3)$ | |
| Clip 12 | $C_{12}$ | $(P_1)$ | |
| Clip 13 | $C_{13}$ | $(P_2)$ | |
| Clip 14 | $C_{14}$ | $(P_3)$ | |
| Clip 15 | $C_{15}$ | $(P_1)$ | $P_1$ |

Block A: Clip 1 – Clip 5
Block B: Clip 6 – Clip 9
Block C: Clip 10 – Clip 15

| Title | Clip Identifier | Player Identifier | Player Identifier Assignment Restriction |
|---|---|---|---|
| Clip 1 | $C_1$ | $P_3$ | $P_3$ |
| Clip 2 | $C_2$ | $P_1$ | |
| Clip 3 | $C_3$ | $P_2$ | |
| Clip 4 | $C_4$ | $P_3$ | |
| Clip 5 | $C_5$ | $P_1$ | |
| Commercial Break Marker | | | |
| Clip 6 | $C_6$ | $P_2$ | |
| Clip 7 | $C_7$ | $P_3$ | $P_3$ |
| Clip 8 | $C_8$ | $P_1$ | |
| Clip 9 | $C_9$ | $P_2$ | |
| Commercial Break Marker | | | |
| Clip 10 | $C_{10}$ | $P_3$ | |
| Clip 11 | $C_{11}$ | $P_1$ | |
| Clip 12 | $C_{12}$ | $P_2$ | |
| Clip 13 | $C_{13}$ | $P_3$ | |
| Clip 14 | $C_{14}$ | $P_1$ | |
| Clip 15 | $C_{15}$ | $P_2$ | $P_2$ |

Clips 1–5: Block A
Clips 6–9: Block B
Clips 10–15: Block C

FIG. 3F

CLIP SCHEDULING WITH CONFLICT ALERT

RELATED DISCLOSURE

This disclosure is a continuation of U.S. patent application Ser. No. 14/209,190 filed on Mar. 3, 2014.

USAGE AND TERMINOLOGY

Throughout this application, with respect to all reasonable derivatives of such terms, and unless otherwise specified (and/or unless the particular context clearly dictates otherwise), each usage of:
 "a" or "an" means at least one.
 "the" means the at least one.
 "video" means any material represented in a video format (i.e., having multiple frames). In some instances, video may include multiple sequential frames that are identical or nearly identical, and that may give the impression of a still image. Video may or may not include an audio portion.
 "clip" means a portion of video.
 "player" means a video player.

TECHNICAL FIELD

The disclosed system and method relate generally to scheduling clips, such as in connection with a news production system.

BACKGROUND

Unless otherwise indicated herein, the materials described in this section are not prior art to the claims in this disclosure and are not admitted to be prior art by inclusion in this section.

A news production system (NPS) may facilitate the production of a news program for television broadcast. In this context, the news program may be produced in accordance with a "rundown." Generally, a rundown is a schedule of events (and related information) that make up a news program. For instance, a rundown may indicate that various clips are to be loaded and played out by a player in a particular order so that the clips may be part of the news program.

For a variety of reasons, it may take several seconds for a player to load a clip. Also, a player may be configured such that it may either load or playout a clip (but not both together) at any given time. Therefore, there may be a delay between the time that a particular player finishes playing out a first clip and the time that the player may begin playing out a second clip (i.e., to allow the player sufficient time to load the second clip). Such a delay may be problematic, such as where a rundown indicates that the second clip should be played out immediately after the first clip (i.e., without any intervening delay).

SUMMARY

In one aspect, an example method involves: (i) a computing device accessing a first list that includes ordered clip identifiers $C_1 \ldots C_n$; (ii) the computing device accessing a second list that includes ordered player identifiers $P_1 \ldots P_x$, wherein x<n; (iii) the computing device determining that a clip identifier $C_m$ of the clip identifiers $C_1 \ldots C_n$ is restricted to being assigned a player identifier $P_z$ from the player identifiers $P_1 \ldots P_x$; (iv) the computing device making a first determination that a clip identifier $C_p$ is a next one of the clip identifiers $C_1 \ldots C_n$ after the clip identifier $C_m$ to have a player-identifier assignment-restriction; (v) responsive to the computing device making the first determination, the computing device (a) determining that the clip identifier $C_p$ is restricted to being assigned a player identifier $P_y$ from the player identifiers $P_1 \ldots P_x$, and (b) matching with each clip identifier $C_{m+1} \ldots C_p$ in reverse order a respective one of the player identifiers $P_1 \ldots P_x$ selected in a reverse ordered and looping fashion starting with the player identifier $P_y$; (vi) the computing device making a second determination that the clip identifier $C_{m+1}$ has been matched with the player identifier $P_z$; and (vii) responsive to the computing device making the second determination, the computing device causing an alert to be output.

In another aspect, an example computing device includes an output component; a processor; and a non-transitory computer readable medium having stored thereon program instructions that when executed by the processor cause the computing device to perform a set of functions. The set of functions involves (i) accessing a first list that includes ordered clip identifiers $C_1 \ldots C_n$; (ii) accessing a second list that includes ordered player identifiers $P_1 \ldots P_x$, wherein x<n; (iii) determining that a clip identifier $C_m$ of the clip identifiers $C_1 \ldots C_n$ is restricted to being assigned a player identifier $P_z$ from the player identifiers $P_1 \ldots P_x$; (iv) making a first determination that a clip identifier $C_p$ is a next one of the clip identifiers $C_1 \ldots C_n$ after the clip identifier $C_m$ to have a player-identifier assignment-restriction; (v) responsive to making the first determination, (a) determining that the clip identifier $C_p$ is restricted to being assigned a player identifier $P_y$ from the player identifiers $P_1 \ldots P_x$, (b) matching with each clip identifier $C_{m+1} \ldots C_p$ in reverse order a respective one of the player identifiers $P_1 \ldots P_x$, selected in a reverse ordered and looping fashion starting with the player identifier $P_y$; (vi) making a second determination that the clip identifier $C_{m+1}$ has been matched with the player identifier $P_z$, and (vii) responsive to making the second determination, causing an alert to be output by the output component.

In another aspect, an example method involves: (i) accessing a first list that includes ordered clip identifiers $C_1 \ldots C_n$; (ii) accessing a second list that includes ordered player identifiers $P_1 \ldots P_x$, wherein x<n; (iii) determining that a clip identifier $C_m$ of the clip identifiers $C_1 \ldots C_n$ is restricted to being assigned a player identifier $P_z$ from the player identifiers $P_1 \ldots P_x$; (iv) making a first determination that a clip identifier $C_p$ is a next one of the clip identifiers $C_1 \ldots C_n$ after the clip identifier $C_m$ to have a player-identifier assignment-restriction; (v) responsive to making the first determination, (a) determining that the clip identifier $C_p$ is restricted to being assigned a player identifier $P_y$ from the player identifiers $P_1 \ldots P_x$, and (b) matching with each clip identifier $C_{m+1} \ldots C_p$ in reverse order a respective one of the player identifiers $P_1 \ldots P_x$, selected in a reverse ordered and looping fashion starting with the player identifier $P_y$; (vi) making a second determination that the clip identifier $C_{m+1}$ has been matched with the player identifier $P_z$; and (vii) responsive to making the second determination, causing an alert to be output.

These, as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3B is a diagram of the example rundown of FIG. 3A, in a second state.

FIG. 3D is a diagram of the example rundown of FIG. 3A, in a fourth state.

FIG. 3F is a diagram of the example rundown of FIG. 3A, in a sixth state.

DETAILED DESCRIPTION OF THE DRAWINGS

I. Overview

Figure 1:
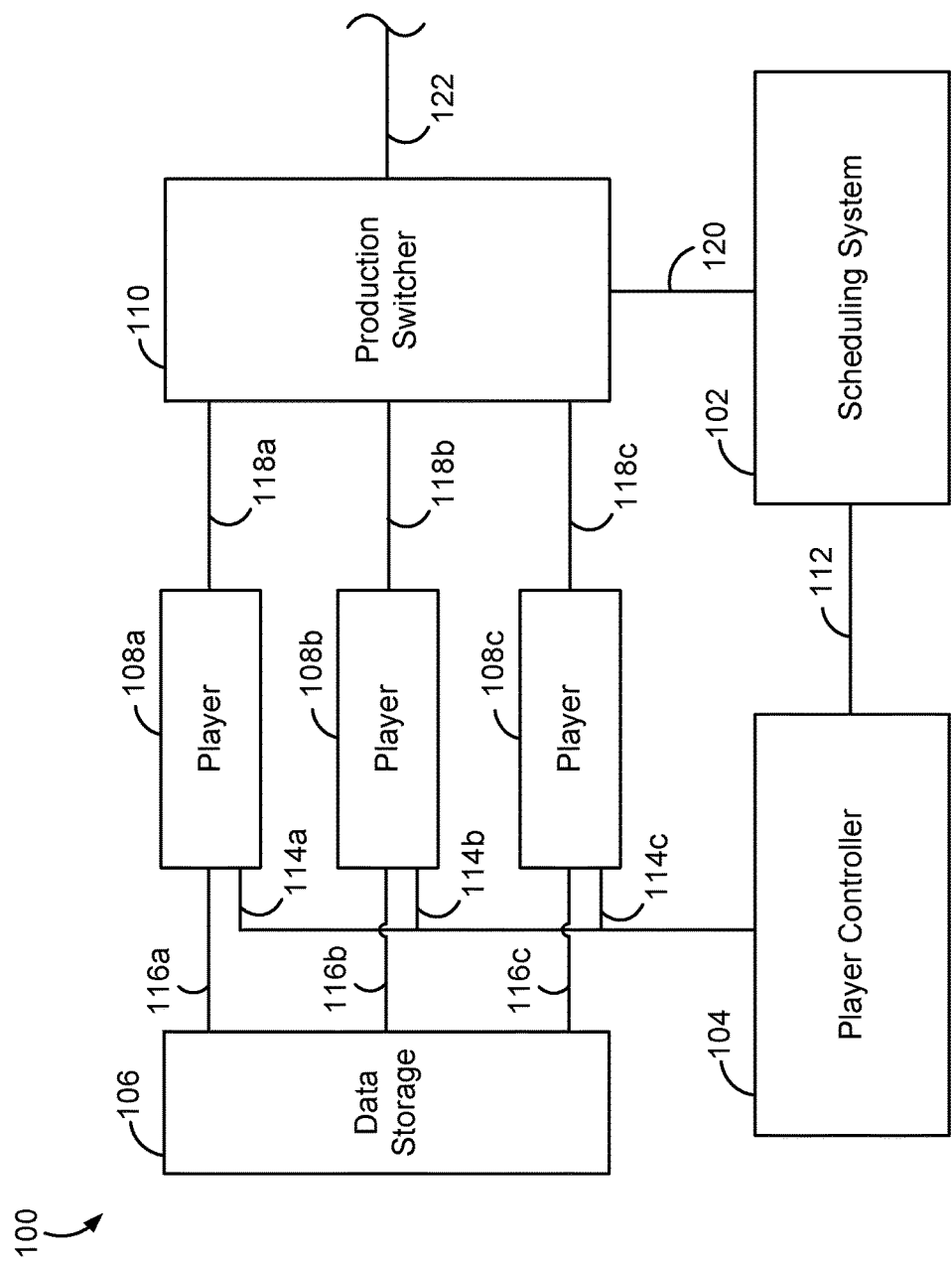
FIG. 1 is a simplified diagram of an example NPS.

As discussed above, in the context of an NPS, there may be a delay between the time that a particular player finishes playing out a first clip and the time that the player may begin playing out a second clip. To help address this issue, an NPS may use multiple players to load and playout clips indicated in a rundown.

With this configuration, a user may assign to each clip, a respective player in such a manner so as to reduce or avoid the delay issue discussed above. Note that in a rundown, players may be identified by player identifiers and clips may be identified by clip identifiers. As such, the process of a user assigning a player to a clip may involve the user editing the rundown to indicate that a particular player identifier is assigned to a particular clip identifier.

To illustrate how a user may assign players to clips in a manner that reduces or avoids the delay issue discussed above, consider an NPS that includes two players. In this instance, a user may assign to clips in a rundown, one of two players selected in an alternating fashion. Therefore, while a first player is playing out a first clip, a second player may load a second clip. And when the first player finishes playing out the first clip, the second player may immediately start playing out the second clip. This process may be repeated such that each pair of ordered clips may be played out in order and without any intervening delay.

In some cases, such as where the first clip has a short duration, it may take longer for the second player to load the second clip than it takes for the first player to playout the first clip. Therefore, in some instances an NPS may need to use three or more players to reduce or avoid the delay issue discussed above. However, as an NPS uses more players in this manner, it may become difficult for a user to determine which players should be assigned to which clips to further this goal.

This process may be further complicated by the fact that a rundown may be edited after players have already been assigned to clips. Indeed, in some instances, a rundown may even be edited while the news program is being produced.

This process may be even further complicated by the fact that a particular clip may need to be played out by a particular player. This type of restriction may exist for a variety of reasons. For example, the particular player may be connected to a particular physical input of a production switcher, where that physical input (and perhaps only that physical input) is configured to apply a particular digital video effect (DVE) to video received on that physical input.

In view of these restrictions, another approach for assigning players to clips may involve a scheduling system assigning a player identifier to a clip identifier in accordance with a player-identifier assignment-restriction of that clip identifier. Then, the scheduling system may traverse some or all of the preceding clip identifiers in reverse order and assign to each of them an appropriate player identifier. Such player identifiers may be selected in a reverse ordered and looping fashion so as to help avoid the delay issue discussed above. This particular technique for assigning player identifiers to clip identifiers is described in greater detail in the cross-referenced disclosure.

Among other things, by traversing the clip identifiers in reverse order starting with the clip identifier that has the player-identifier assignment-restriction, the scheduling system may ensure that the clip identified by that clip identifier is assigned a player in accordance with its assignment restriction.

Further, by "reverse looping" through the player identifiers, a given player has a strong likelihood of having a sufficient amount of time to load a clip before needing to play it out. Indeed, given an NPS with x players, in the general case, once a player has played out a clip, that player need not playout its next clip until $x-1$ other players have played out $x-1$ clips, respectively. For instance, where an NPS uses three players, once a player has played out a clip, that player need not playout its next clip until two other players have played out two other clips, respectively.

Notably however, in some instances a rundown may include multiple clip identifiers that have respective player-identifier assignment-restrictions. And in such cases, the process of assigning players identifiers to clip identifiers in the manner described above may cause one or more clip identifiers to be assigned a respective player identifier in violation of a clip identifier's player-identifier assignment-restriction. This may be referred to as a scheduling conflict.

Examples of the disclosed system and method may help prevent such conflicts by simulating the assignment of player identifiers to clip identifiers, determining that the simulated assignments would cause a conflict, and responsively causing an alert to be output. Based on this alert, the user may then edit the rundown so as to avoid the conflict.

More particularly, an example method may involve a scheduling system accessing a first list that includes ordered clip identifiers $C_1 \ldots C_n$. For instance, the first list may include ordered clip identifiers $C_1 \ldots C_{10}$. Further, the example method may involve the scheduling system accessing a second list that includes ordered player identifiers $P_1 \ldots P_x$. For instance, the second list may include player identifiers $P_1 \ldots P_3$.

The example method may involve the scheduling system determining that a clip identifier $C_m$ of the clip identifiers $C_1 \ldots C_n$ is restricted to being assigned a player identifier $P_z$, from the player identifiers $P_1 \ldots P_x$, For instance, this may involve the scheduling system determining that the clip identifier $C_1$ is restricted to being assigned the player identifier $P_1$.

Still further, the example method may involve the scheduling system making a first determination that a clip identifier $C_p$ is a next one of the clip identifiers $C_1 \ldots C_n$ after the clip identifier $C_m$ to have a player-identifier assignment-restriction. For instance, continuing with the example above, this may involve the scheduling system making a determination that the clip identifier $C_7$ is a next one of the clip identifiers $C_1 \ldots C_{10}$ after the clip identifier $C_1$ to have a player-identifier assignment-restriction.

The example method may also involve responsive to the scheduling system making the first determination, the scheduling system determining that the clip identifier $C_p$ is restricted to being assigned a player identifier $P_y$ from the player identifiers $P_1 \ldots P_x$. For instance, continuing with the example above, this may involve the scheduling system determining that the clip identifier $C_7$ is restricted to being assigned the player identifier $P_3$.

And still further, the example method may involve responsive to the scheduling system making the first determination, the scheduling system matching with each clip identifier $C_{m+1} \ldots C_p$ in reverse order a respective one of the player identifiers $P_1 \ldots P_x$, selected in a reverse ordered and looping fashion starting with the player identifier $P_y$. For instance, continuing with the example above, this may involve the scheduling system matching with each clip identifier $C_2 \ldots C_7$ in reverse order a respective one of the player identifiers $P_1 \ldots P_3$ selected in a reverse ordered and looping fashion starting with the player identifier $P_3$ such that: $C_2$ is matched with $P_1$, $C_3$ is matched with $P_2$, $C_4$ is matched with $P_3$, $C_5$ is matched with $P_1$, $C_6$ is matched with $P_2$, and $C_7$ is matched with $P_3$.

The example method may further involve the scheduling system making a second determination that the clip identifier $C_{m+1}$ has been matched with the player identifier $P_z$. For instance, continuing with the example above, this may involve the scheduling system making a second determination that the clip identifier $C_2$ has been matched with the player identifier $P_1$. Notably, this second determination indicates that one player identifier would be assigned to two consecutive clips identifiers within the rundown (i.e., player identifier $P_1$ would be assigned to both clip identifiers $C_1$ and $C_2$) if player identifiers were assigned to clip identifiers in accordance with the "reverse" technique described above. And as noted above, this presents a scheduling conflict.

To address this, the example method may further involve responsive to the scheduling system making the second determination, the scheduling system causing an alert to be output. Then, based on this alert, a user (or perhaps the scheduling system) may edit the rundown to avoid the conflict.

While in one example, the disclosed method may be implemented in connection with a NPS and a news program, the disclosed method may also be implemented in connection with other types of systems and with other types of programs or other video. For instance, in one example, the disclosed method may be implemented in connection with a master control system.

II. Example NPS

FIG. 1 is a simplified block diagram of an example NPS 100. The NPS 100 may be configured to perform a variety of functions related to producing a news program. The NPS may output the news program in video form, which in turn may be sent to a broadcasting system for broadcast (e.g., via an over-the-air television broadcast or an Internet feed). It is understood that the video output from the NPS 100 may be subjected to additional processing before being broadcast. For example, the video may be modified with a DVE before being broadcast.

The NPS 100 may include one or more devices, including for example a scheduling system 102, a player controller 104, a data storage 106, one or more players 108a-c, and a production switcher 110. Note that the NPS 100 need not include all of these devices and it may include additional devices.

Generally, the scheduling system 102 is configured to perform functions related to scheduling and managing the production of a news program, the player controller 104 is configured to perform functions related to controlling the players 108a-c, and the production switcher 110 is configured to perform functions related to input-to-output mapping and running DVEs.

Generally, each player 108a-c is configured to perform functions related to loading and/or playing out a clip. Each player 108a-c may take a variety of forms. For instance, each player 108a-c may take the form of a video player device or a software-based video player executing on a computing device.

These devices may communicate with each other and/or with external devices via one or more communication paths. For example, the scheduling system 102 and the player controller 104 may communicate via path 112, the player controller 104 and the players 108a-c may communicate via respective paths 114a-c, and the players 108a-c and the data storage 106 may communicate via respective paths 116a-c. Further, the players 108a-c and the production switcher 110 may communicate via respective paths 118a-c, the scheduling system 102 and the production system 110 may communicate via path 120, and the production switcher 110 may communicate with a device outside of the NPS 100, such as a television broadcasting system, via a path 122.

These devices may communicate with each other and/or with external devices according to one or more protocols. For example, the devices may communicate in accordance with one or more versions of the Media Object Server (MOS) protocol.

Figure 2:
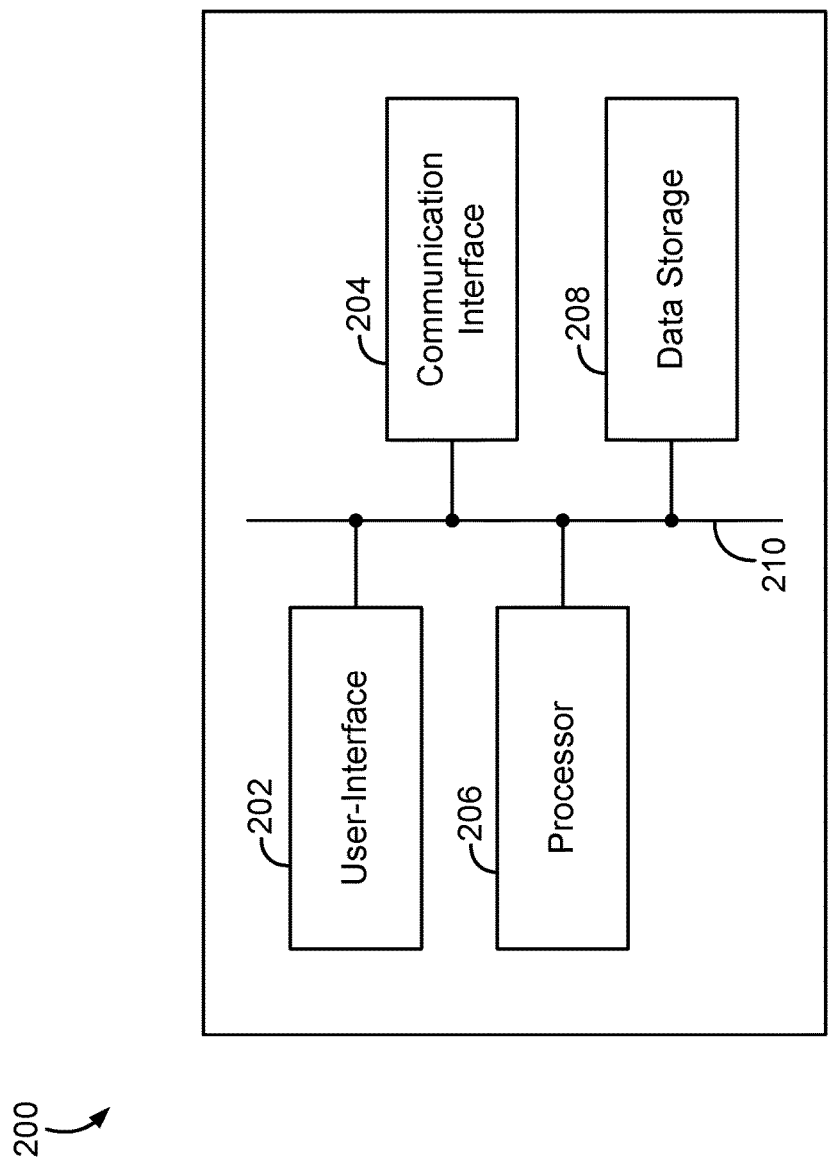
FIG. 2 is a simplified diagram of an example device.

FIG. 2 is a simplified block diagram of a device 200. The device 200 may take a variety of forms, including for example the scheduling system 102, the player controller 104, the data storage 106, one of the players 108a-c, or the production switcher 110.

The device 200 may include various components, including for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker.

The communication interface 204 may function to allow the device 200 to communicate with other devices. In one example, the communication interface 204 may take the form of a wired interface, such as an Ethernet port, USB port, or High-Definition Multimedia Interface (HDMI) port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the functions described herein and/or shown in the accompanying drawings. As such, the data storage 208 may take the form of a non-transitory computer-readable storage medium, having stored thereon program instructions that, upon execution by the processor 206, cause the device 200 to perform one or more of the functions described herein and/or shown in the accompanying drawings.

III. Example Rundown

Figure 3A:
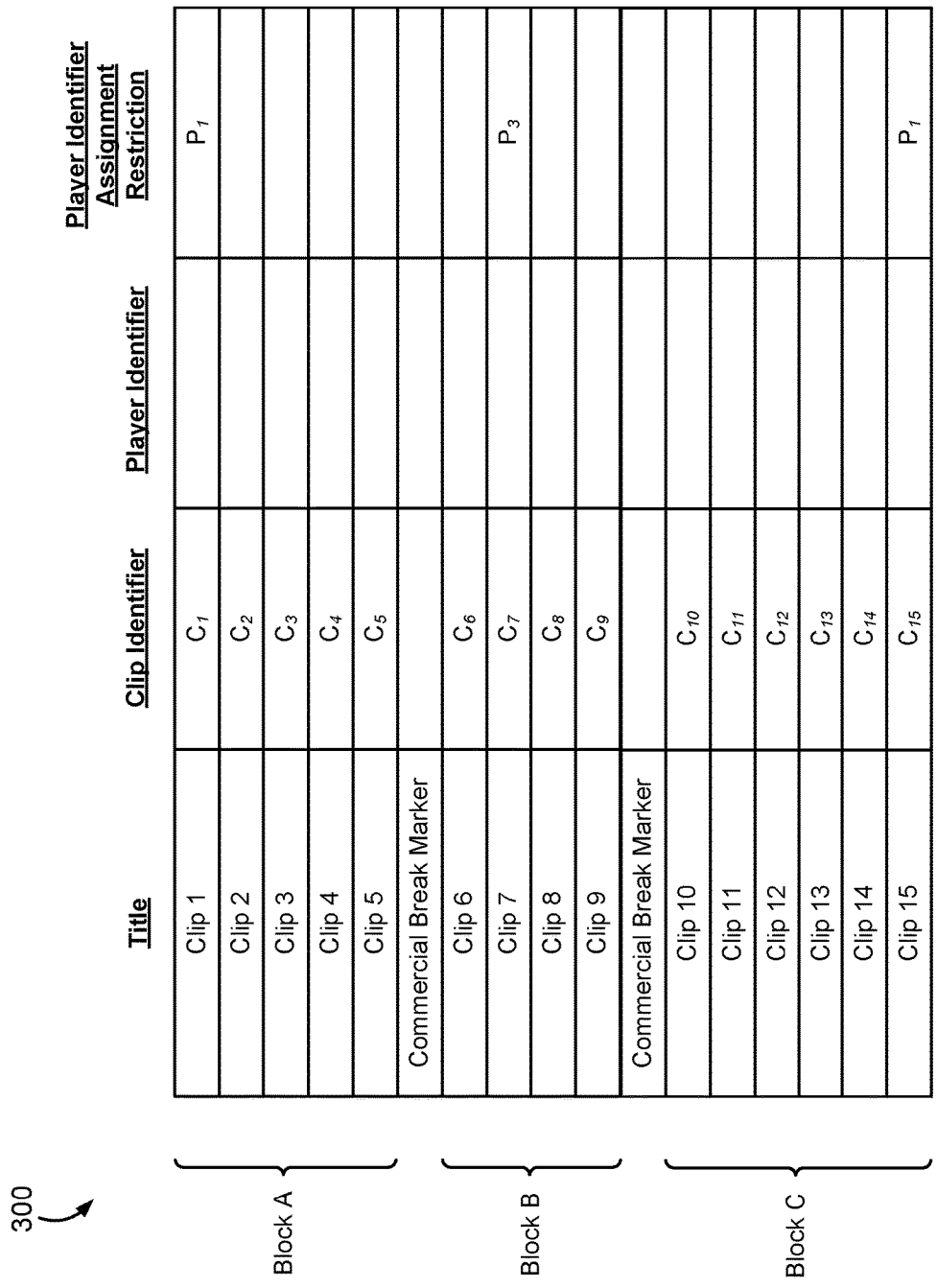
FIG. 3A is a diagram of an example rundown in a first state.

FIG. 3A shows portions of an example rundown 300 for a news program. The rundown 300 includes ordered rundown entries, each represented as a separate row. Each rundown entry includes one or more attributes, such as a title, a clip identifier, a player identifier, and/or a player-identifier assignment-restriction as shown in the respective columns. For example, the first rundown entry has a title "Clip 1," a clip identifier "$C_1$," and a player-identifier assignment-restriction "$C_1$" (i.e., indicating that Clip 1 must be played out of the player identified as $P_1$). As another example, the sixth rundown entry has a title "Commercial Break Marker." As yet another example, the eight rundown entry has a title "Clip 7," a clip identifier "$C_7$," and a player-identifier assignment-restriction "$P_3$". As still another example, the seventieth rundown entry has a title "Clip 15," a clip identifier "$C_{15}$," and a player-identifier assignment-restriction "$P_1$".

Note that these attributes may be represented in a variety of different manners. For instance, rather the player-identifier assignment-restriction having a player identifier value, it may have a true or false value that indicates whether or not a corresponding player identifier attribute represents an assignment restriction.

Also, a news program is typically divided by one or more commercial breaks into separate "blocks," which may be reflected in the corresponding rundown. For example, a rundown may include one or more commercial break markers that divide the rundown into separate blocks. Since a rundown may include ordered clip identifiers as described above, the clip identifiers may also be separated into separate blocks, where each block of clip identifiers corresponds to clips in a respective block of the news program. As shown, the rundown 300 includes a two commercial breaks markers that divide the rundown into Block A, Block B, and Block C.

In one example, a user may create the rundown 300 via a user interface of a scheduling system and store the rundown in a data storage of the scheduling system. As such, by utilizing the rundown 300, the user may indicate which clip is required to be played out of which player.

Notably, each of FIGS. 3A-3F shows the rundown 300 in a different state. For instance, FIG. 3A shows the rundown in a first state where player identifiers have not yet been added to the rundown. The additional states of the rundown as shown in FIGS. 3B-3F are described below in conjunction with examples of the disclosed method.

It should also be noted that the rundown 300 has been greatly simplified for the purposes of providing examples of the disclosed system and method. In practice, a rundown is likely, although not required, to include significantly more data. For example, a rundown may include additional rundown entries that correspond to events other than playing out clips. Such rundown entries may be arranged before, after, or in between the example rundown entries described above. Further, in some instances, a given rundown entry may correspond to multiple events. As such, in one example, a rundown entry may include multiple clip identifiers (and corresponding assigned player identifiers).

In addition, rundown entries may include additional attributes, including for example, an index or "page" number, an estimated duration, an actual duration, and/or an author. Further, each rundown entry may include a script that, when executed, causes certain NPS-related functions to be performed. Also, in some instances, a rundown entry may include multiple clip identifiers, respective player identifiers, and/or respective player-identifier assignment-restrictions. However, as noted above, for the sake of simplicity, the simplified rundown 300 is provided herein.

III. Example Operations

An example of the disclosed method will now be described principally in connection with a NPS and a news program. However, as noted above, the disclosed method can extend to apply with respect to other types of systems and other types of programs or other video. For instance, the disclosed method may be applied with respect to a master control system.

Figure 4A:
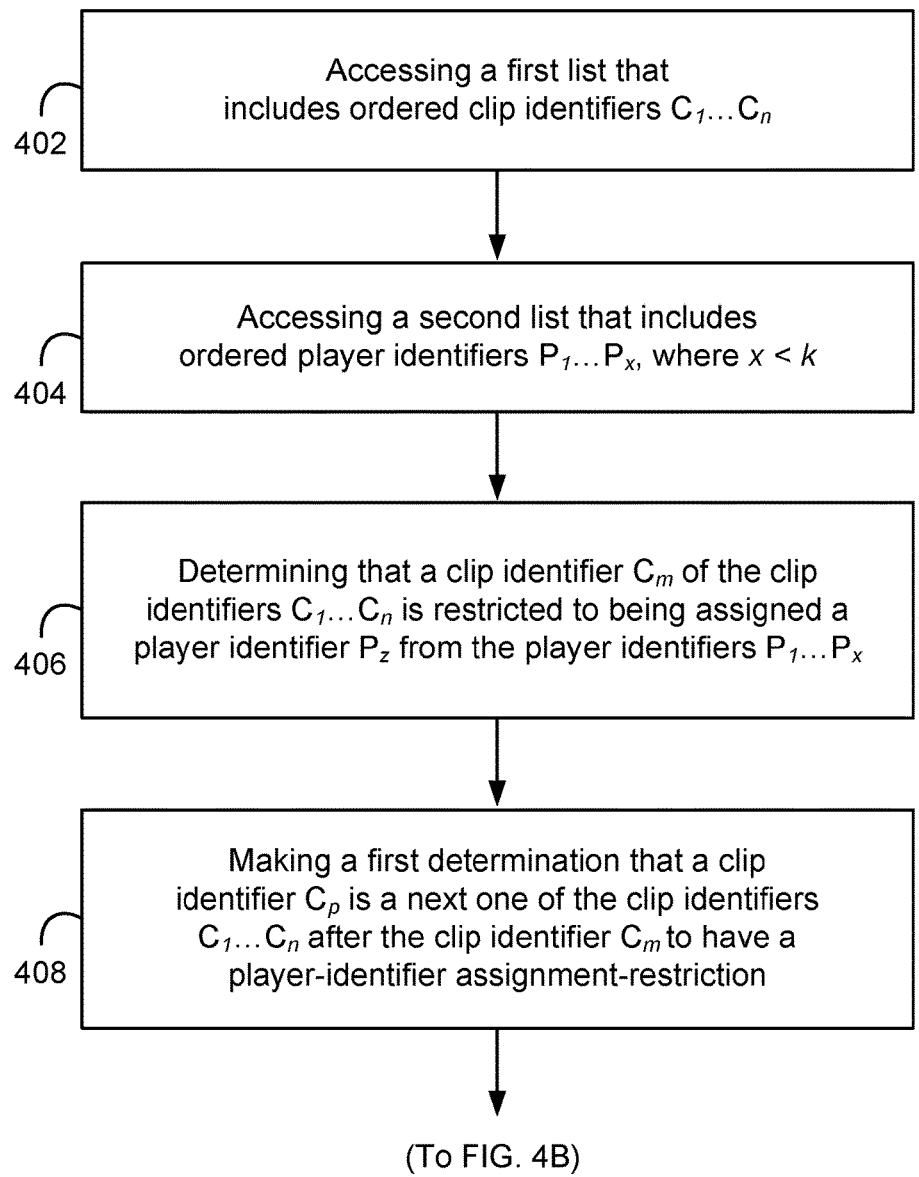
FIG. 4A is a first part of a flowchart showing functions of an example of the disclosed method.
Figure 4B:
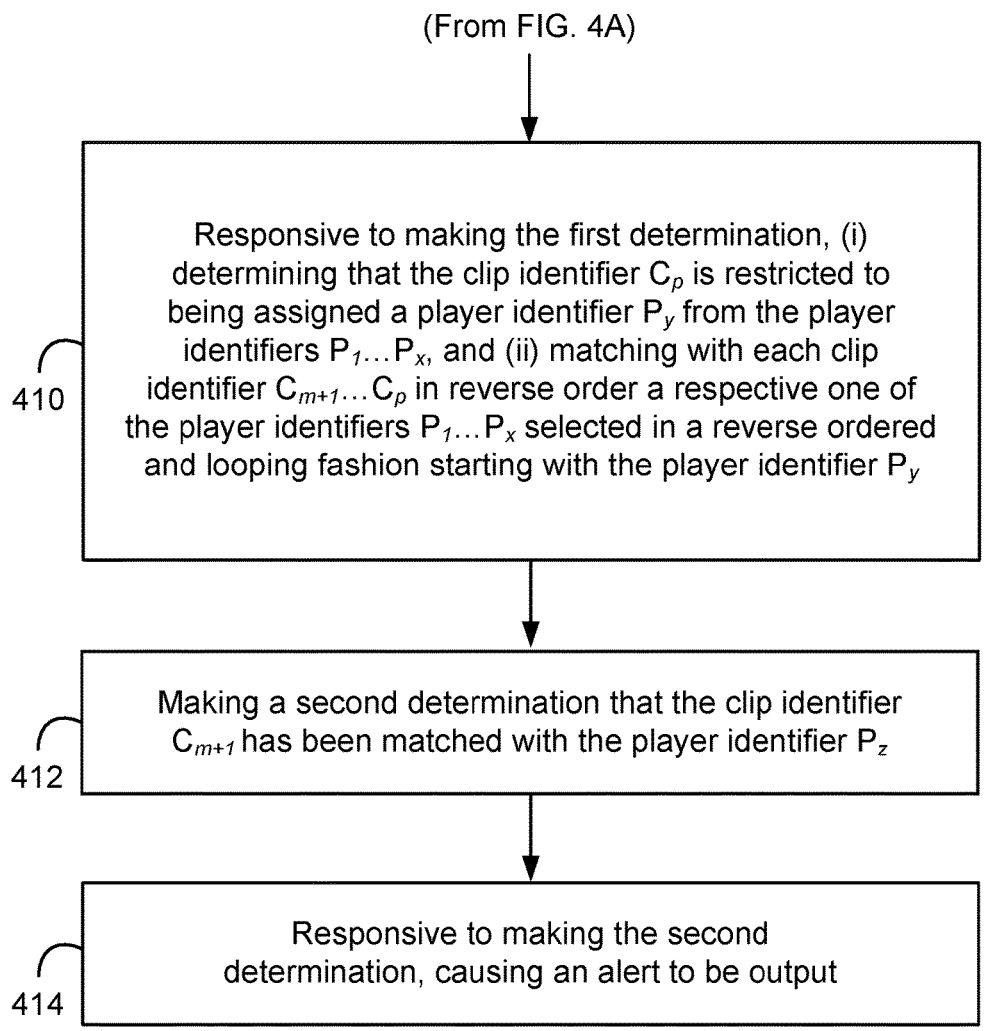
FIG. 4B is a second part of the flowchart of FIG. 4A.

FIG. 4 (FIGS. 4A and 4B) is a flowchart showing functions of an example of the disclosed method. At block 402, the method may involve accessing (e.g., from a local or remote data storage) a first list that includes ordered clip identifiers $C_1 \ldots C_n$. For example, as shown in FIG. 3A, this may involve the scheduling system 102 accessing the rundown 300 that includes ordered clip identifiers $C_1 \ldots C_{15}$. In one example, the scheduling system 102 may access the rundown 300 from a data storage.

At block 404, the method may involve accessing (e.g., from a local or remote data storage) a second list that includes ordered player identifiers $P_1 \ldots P_x$, where x<n. For example, this may involve the scheduling system 102 accessing a list of player identifiers $P_1 \ldots P_3$, where each player identifier $P_1 \ldots P_3$ identifies a respective one of the players 108a-c. For instance, player identifier $P_1$ may identify player 108a, player identifier $P_2$ may identify player 108b, and player identifier $P_3$ may identify player 108c. In one example, the scheduling system 102 may access the list of player identifiers $P_1 \ldots P_3$ from a data storage.

At block 406, the method may involve determining that a clip identifier $C_m$ of the clip identifiers $C_1 \ldots C_n$ is restricted to being assigned a player identifier $P_z$ from the player identifiers $P_1 \ldots P_x$. For example, continuing with the example above, this may involve the scheduling system 102 determining that the clip identifier $C_1$ of the clip identifiers $C_1 \ldots C_{15}$ is restricted to being assigned a player identifier $P_1$ from the player identifiers $P_1 \ldots P_x$. And this may involve the scheduling system 102 determining that the rundown entry that corresponds to the clip identifier $C_1$ (i.e., the first rundown entry in the rundown 300) has a player-identifier assignment-restriction attribute $P_1$.

At block 408, the method may involve making a first determination that a clip identifier $C_p$ is a next one of the clip identifiers $C_1 \ldots C_n$ after the clip identifier $C_m$ to have a player-identifier assignment-restriction. For example, continuing with the example above, this may involve the scheduling system 102 making a first determination that the clip identifier $C_7$ is a next one of the clip identifiers $C_1 \ldots C_{15}$ after the clip identifier $C_1$ to have a player-identifier assignment-restriction.

At block 410, the method may involve, responsive to making the first determination, (i) determining that the clip identifier $C_p$ is restricted to being assigned a player identifier $P_y$ from the player identifiers $P_1 \ldots P_x$, and (ii) matching with each clip identifier $C_{m+1} \ldots C_p$ in reverse order a respective one of the player identifiers $P_1 \ldots P_x$, selected in a reverse ordered and looping fashion starting with the player identifier $P_y$. For example, this may involve responsive to the scheduling system 102 making the first determination the scheduling system 102 determining that the clip identifier $C_7$ is restricted to being assigned a player identifier $P_3$ from the player identifiers $P_1 \ldots P_3$.

As a further example, the function at block 410 may involve, responsive to the scheduling system 102 making the first determination the scheduling system 102 matching with each clip identifier $C_2 \ldots C_7$ in reverse order a respective one of the player identifiers $P_1 \ldots P_3$ selected in a reverse ordered and looping fashion starting with the player identifier $P_3$. As shown in FIG. 3B, this causes the clip identifiers $C_2 \ldots C_7$ to be matched with player identifiers as follows: $C_2$ is matched with $P_1$, $C_3$ is matched with $P_2$, $C_4$ is matched with $P_3$, $C_5$ is matched with $P_1$, $C_6$ is matched with $P_2$, and $C_7$ is matched with $P_3$. In one respect, these matches represent simulated assignments of player identifiers to clip identifiers.

Note that such matches are shown in FIGS. 3B-3F as respective player identifiers, but in parentheses to distinguish them from actual assigned player identifiers. Notably, such matches may, but need not be, part of the actual rundown 300. For instance, the matches may be maintained in a data storage of the scheduling system 102.

At block 412, the method may involve making a second determination that the clip identifier $C_{m+1}$ has been matched with the player identifier $P_z$. For example, this may involve the scheduling system 102 making a second determination that the clip identifier $C_2$ has been matched with the player identifier $P_1$. Notably, this second determination indicates that one player identifier would be assigned to two consecutive clips identifiers within the rundown 300 (i.e., player identifier $P_1$ would be assigned to both clip identifiers $C_1$ and $C_2$) if the player identifiers were assigned to clip identifiers in accordance with the matches and player-identifier assignment-restrictions discussed above. And as further noted above, this situation presents a scheduling conflict.

To help prevent such a conflict from occurring, at block 414, the method may involve responsive to making the second determination, causing an alert to be output. For example, this may involve, responsive to the scheduling system 102 making the second determination, the scheduling system 102 sending suitable instructions to an output component to output an alert. For instance, the scheduling system 102 may cause an alert to be displayed by the display screen (e.g., in the form of text, an image, animation, and/or a sound providing a suitable warning), or perhaps the scheduling system 102 may cause an alert to be sounded by a speaker. However, other types of alerts or output components could also be used in this respect. In another example, the alert may indicate specific information relating to the conflict. For instance, the alert could indicate the particular rundown entries that are causing the conflict (e.g., by highlighting those entries on the rundown 300).

Figure 3C:
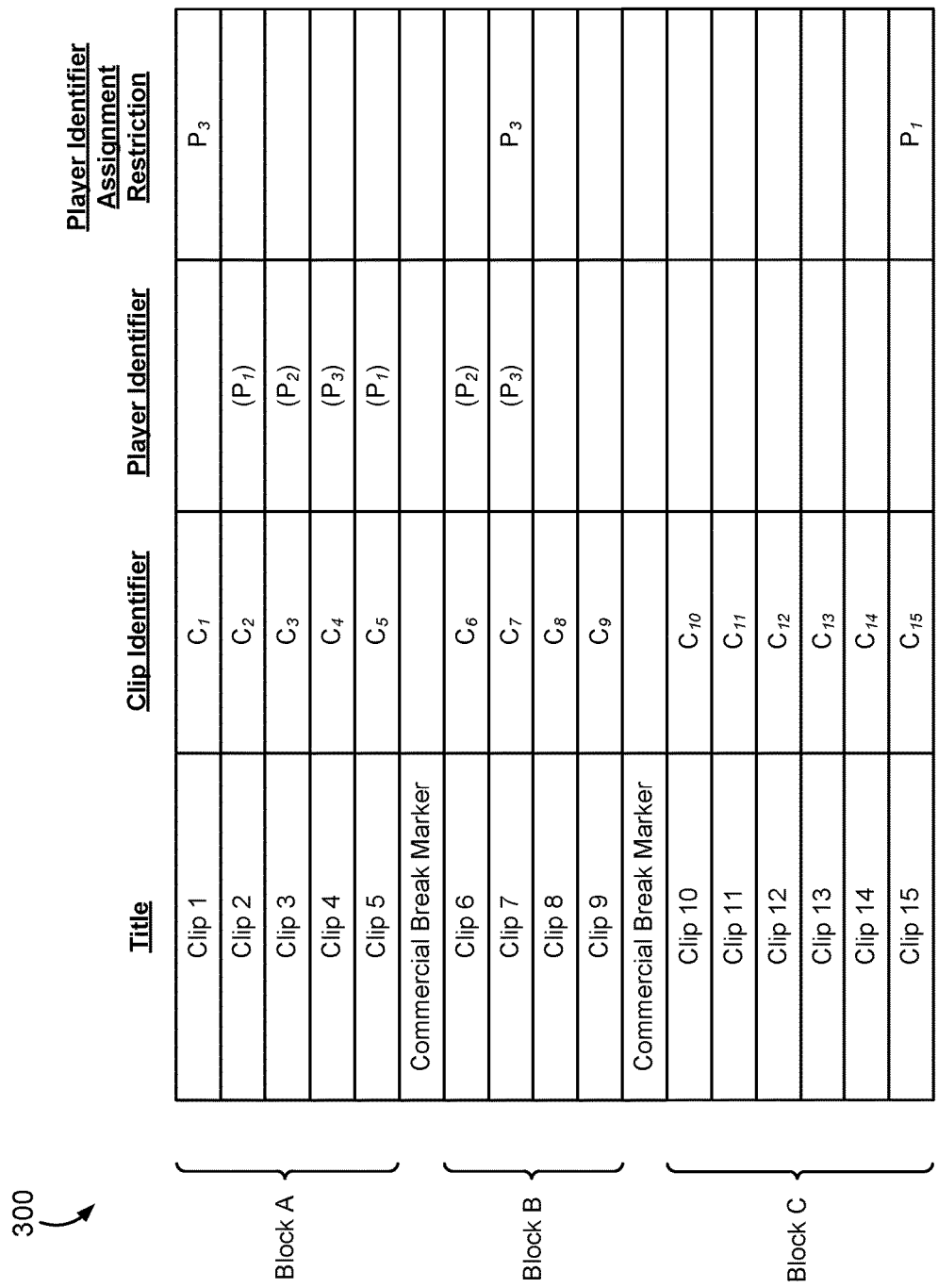
FIG. 3C is a diagram of the example rundown of FIG. 3A, in a third state.

Based on this alert, a user may edit the rundown 300 to avoid the conflict. For example, the user may modify the first entry in the rundown 300 such that the clip identifier $C_1$ has a player-identifier assignment-restriction of $P_3$ instead of $P_1$. Note that this may involve the user editing a script of the first rundown entry to specify that an alternative DVE should be run while the clip identified by $C_1$ is played out. FIG. 3C shows the rundown 300 after this change is made and after the functions at blocks 402-410 are performed (where the clip identifier $C_m$ is the clip identifier $C_1$ and the clip identifier $C_p$ is the clip identifier $C_7$). Note that the functions at blocks 412-414 are not performed here because in this instance because the conflict described above no longer exists.

It should be noted that a user may edit the rundown in a variety of other manners to resolve a conflict. For instance, the user may change the order of entries, remove an entry, or add an entry to resolve the conflict. Also, the scheduling system 102 may be configured to edit the rundown (e.g., according to one or more predefined rules) in response to the alert being output.

Despite the change reflected in FIG. 3C, another portion of the rundown 300 may present a conflict, thereby still causing an alert to be output. For instance, the functions at blocks 402-414 may be repeated, but this time with the clip identifier $C_m$ being the clip identifier $C_7$ and the clip identifier $C_m$ being the clip identifier $C_{15}$. FIG. 3D shows the rundown 300 after this change is made and after such functions are performed. As shown, again one player identifier would be assigned to two consecutive clips identifiers within the rundown 300 (i.e., player identifier $P_3$ would be assigned to clip identifiers $C_7$ and $C_8$) if the player identifiers were assigned to clip identifiers in accordance with the matches and player-identifier assignment-restrictions discussed above. As a result, the scheduling system 102 causes an alert to be output.

Figure 3E:
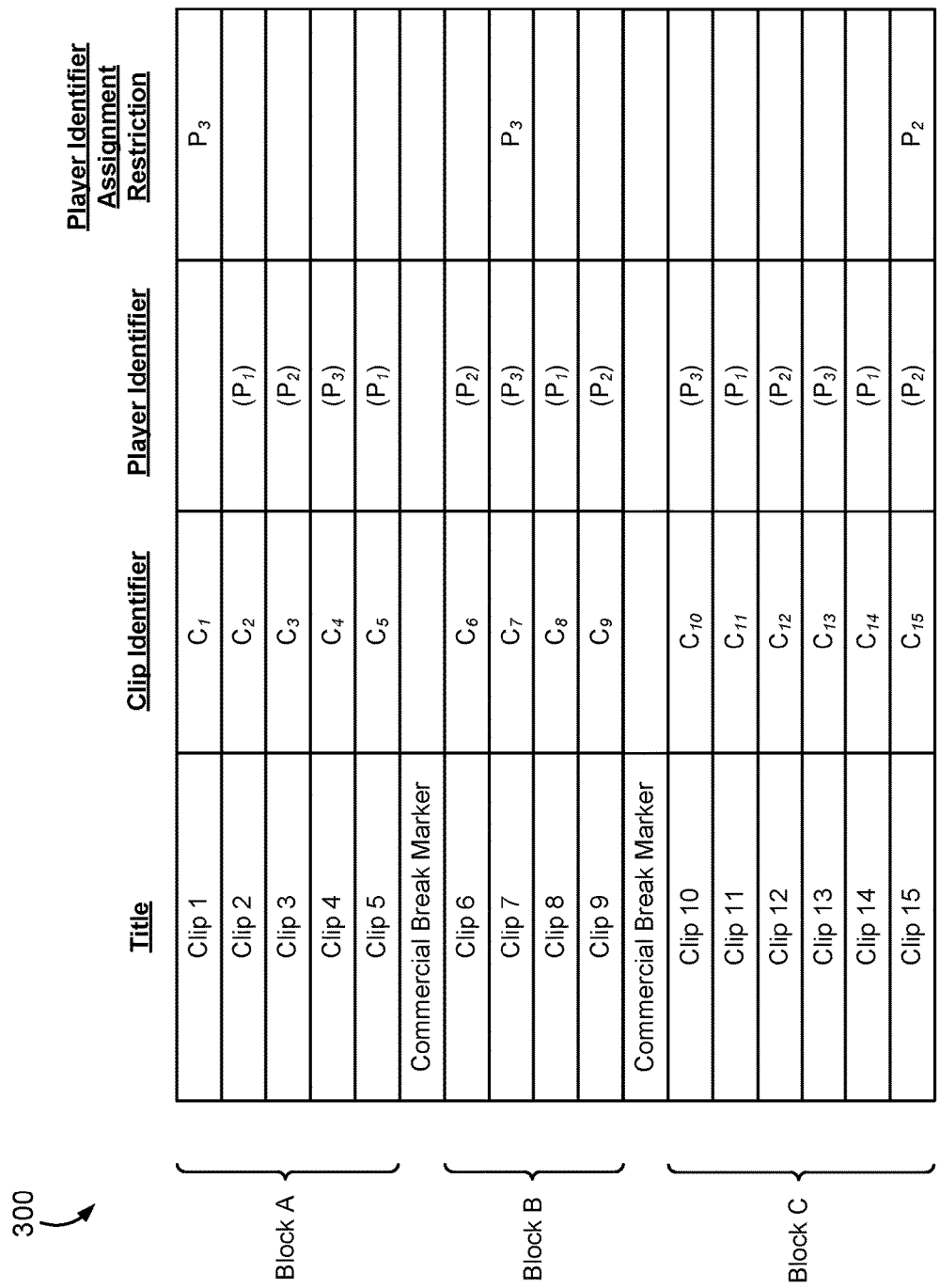
FIG. 3E is a diagram of the example rundown of FIG. 3A, in a fifth state.

Once again, based on this alert, a user may edit the rundown 300 to avoid the conflict. For example, the user may modify the seventieth entry in the rundown such that the clip identifier $C_{15}$ has a player-identifier assignment-restriction of $P_2$ instead of $P_1$. FIG. 3E shows the rundown 300 after this change is made and after the functions at blocks 402-410 are performed (where the clip identifier $C_m$ is the clip identifier $C_7$ and the clip identifier $C_p$ is the clip identifier $C_{15}$). Note that the functions at blocks 412-414 are not performed here because in this instance the conflict described above no longer exists.

Notably, the scheduling system may attempt to perform the functions at blocks 402-414 for each pair of clip identifiers $C_m$ and $C_p$ as described above. But if the scheduling system 104 is unable to perform all of the functions at blocks 402-414 in connection with the rundown 300, the rundown may not have a conflict, and therefore the scheduling system 102 may proceed to assign player identifiers to clip identifiers in accordance with the matching and player-identifier assignment-restrictions discusses above. FIG. 3F shows the rundown 300 after such assignments have been made.

It should be noted that the scheduling system 102 may assign player identifiers to any still remaining clip identifiers (i.e., that have not been assigned player identifiers) in a variety of ways. For instance, this may involve the scheduling system 102 assigning to each remaining clip identifier in order a respective one of the player identifiers $P_1 \ldots P_x$ selected in an ordered and looping fashion starting with a particular player identifier.

Once the player identifiers have been assigned to the clip identifiers, the method may involve traversing the clip identifiers $C_1 \ldots C_n$, and for each traversed clip identifier, causing a player identified by the one of the player identifiers $P_1 \ldots P_x$, assigned to the traversed clip identifier to load a clip identified by the traversed clip identifier. For example, the method may involve the scheduling 102 system traversing the clip identifiers $C_1 \ldots C_{15}$ and for each traversed clip identifier, the scheduling system 102 causing a player identified by the one of the player identifiers $P_1 \ldots P_3$ assigned to the traversed clip identifier to load a clip identified by the traversed clip identifier.

In one example, the act of traversing the clip identifiers $C_1 \ldots C_n$, and for each traversed clip identifier, causing a player identified by the one of the player identifiers $P_1 \ldots P_x$, assigned to the traversed clip identifier to load a clip identified by the traversed clip identifier may involve the scheduling system 102 sending the traversed clip identifiers and the respectively assigned player identifiers to the player controller 104. In turn, the player controller 104 may (i) map the player identifiers to the players 108a-c, (ii) map the clip identifiers to clips, and (iii) cause the players 108a-c to load the respective, mapped clips. The player controller 104 may cause the players 108a-c to load the respective mapped clips by sending suitable instructions to the players 108a-c, for instance.

In one example, one or more of the players 108a-c may load a clip contemporaneously while another one of the players 108a-c plays out a loaded clip. In this context, the player controller 104 may monitor the status of one of the players 108a-c to determine when the monitored player finishes playing out its previously loaded clip. In response to making this determination, the player controller 104 may then cause the monitored player 108a-c to load its next clip. This way, the players 108a-c collectively may be able to playout each clip indicated in the rundown in order and without any undesired delay.

Each of the players 108a-c may be configured to play out a clip in response receiving a request. Likewise, the production switcher 110 may be configured to set a given input-to-output mapping (e.g., to map one of its physical inputs to one of its physical output) in response to receiving a request. As such, in response to one of the players 108a-c and the production switcher 110 receiving suitable requests, the player 108a-c may playout a clip that gets channeled through the production switcher 110 and made part of the news program.

The clip may be made part of the news program in a variety of way. For instance, the production switcher 110 may run a DVE (e.g., as indicated in a rundown) that combines video from one or more physical inputs to produce the news program. For example, the output video may include live video of a news anchor discussing a news story while a clip related to that news story plays in a box over the news anchor's shoulder.

In one example, a user may provide the requests described above directly to one of the players 108a-c and/or to the production switcher 110. Alternatively, the scheduling system 102 may be configured to send such requests. This type of scheduling system 102 may be configured to traverse a rundown one rundown entry at a time (e.g., in response to a user pressing a spacebar key on a keyboard). Then, when the scheduling system 102 traverses a rundown entry that corresponds to a clip, the scheduling system 102 may automatically send (i) a request to the one of the players 108a-c assigned to the clip to play out the clip, (i) and a request to the production switcher 110 to set the appropriate input-to-output mapping such that the production switcher 110 may use the clip as part of the news program. In one example, the scheduling system 102 may cause the one of the players 108a-c and the production switcher 110 to perform these functions at or about the same time.

Notably, in some examples, the scheduling system 102 may send requests to one of the players 108a-c and/or the production switcher 110 via other entities. For instance, the scheduling system 102 may send a request to the player controller 104, which in turn may send the request to the one of the players 108a-c.

In one example, the scheduling system 102 may perform one or more of the functions at blocks 402-414 in response to the scheduling system 102 making a determination that the rundown has been initialized or edited. A rundown may be initialized (sometimes referred to as "MOS activated") at a predetermined time and/or in response to a request from a user, but in either case before the corresponding news program is produced. This initialization process therefore allows the scheduling system 102 to cause an alert to be output before the news program is produced.

A rundown may also be edited at any time, including perhaps while the news program is being produced. And such editing may cause a conflict to be present. However, due to scheduling system 102 performing one or more functions at blocks 402-414 in response to making a determination that the rundown 300 has been edited, the scheduling system 102 may cause an alert to be output when appropriate. Note that while the news program is being produced, any clip that is currently being played out of a player is inherently restricted to being assigned that player, and therefore the scheduling system may consider a corresponding player-identifier assignment-restriction to be present.

VII. Example Variations

While one or more functions have been described as being performed by certain devices or entities (e.g., the scheduling system 102), the functions may be performed by any device or entity, such as those included in the NPS 100 described above.

For instance, rather than the scheduling system 102 assigning player identifiers to clip identifiers, the scheduling system 102 may send clip identifiers to the player controller 104 such that the player controller 104 may assign player identifiers to clip identifiers. Then, the player controller 104 may send to the scheduling system 102, an indication of such assignments such that the scheduling system 102 may edit the rundown accordingly.

Further, while examples of the disclosed method have been described in connection with an NPS and a news program, examples of the method may be implemented in other environments and/or in connection with other programs or other types of video. For instance, in one example, the disclosed method may be implemented in connection with a master control system. A master control system may facilitate the broadcast of a program according to a traffic schedule (sometimes referred to as a "traffic log"), which specifies an order of events that relate to a broadcast for a given station during a given time period. According to one example variation, in connection with the method described above, rather than being part of a rundown, the first list may be part of a traffic schedule for a program broadcast. In this instance, a block of clip identifiers may correspond to a block of the program broadcast, and another block of clip identifiers may correspond to another block of the program broadcast. The blocks of clip identifiers may be separated from each other by a particular portion of the traffic schedule, such as a reference to a particular video source, for instance.

Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A non-transitory computer-readable medium including a set of program instructions, that when executed, cause performance of a set of functions for use with multiple video players, the set of functions comprising:
accessing a first list that includes ordered clip identifiers $C_1 \ldots C_n$;
accessing a second list that includes ordered player identifiers $P_1 \ldots P_x$, wherein x<n, wherein x and n are integers;
determining that a clip identifier $C_m$ of the clip identifiers $C_1 \ldots C_n$ is restricted to being assigned a player identifier $P_z$ from the player identifiers $P_1 \ldots P_x$;
making a first determination that a clip identifier $C_p$ is a next one of the clip identifiers $C_1 \ldots C_n$ after the clip identifier $C_m$ to have a player-identifier assignment-restriction;
responsive to making the first determination, (i) determining that the clip identifier $C_p$ is restricted to being assigned a player identifier $P_y$ from the player identifiers $P_1 \ldots P_x$, and (ii) matching with each clip identifier $C_{m+1} \ldots C_p$ in reverse order a respective one of the player identifiers $P_1 \ldots P_x$ selected in a reverse ordered and looping fashion starting with the player identifier $P_y$;
making a second determination that the clip identifier $C_{m+1}$ has been matched with the player identifier $P_z$; and
responsive to making the second determination, causing an alert to be output.

2. The non-transitory computer-readable medium of claim 1, wherein the first list is part of a rundown for a news program.

3. The non-transitory computer-readable medium of claim 2, the set of functions comprising:
making a third determination that the rundown has been initialized or edited, wherein determining that the clip identifier $C_m$ is restricted to being assigned the player identifier $P_z$ occurs in response to making the third determination.

4. The non-transitory computer-readable medium of claim 1, wherein the first list is part of a traffic schedule for a program broadcast.

5. The non-transitory computer-readable medium of claim 1, wherein each of the player identifiers identifies a respective one of a plurality of players.

6. The non-transitory computer-readable medium of claim 5, wherein the plurality of players comprises one of a video player device and a software-based video player executing on a computing device.

7. The non-transitory computer-readable medium of claim 1, wherein causing the alert to be output comprises causing the alert to be displayed by a display device.

8. The non-transitory computer-readable medium of claim 1, wherein causing the alert to be output comprises causing the alert to be sounded by a speaker.

9. A computing device comprising:
a processor; and
a non-transitory computer-readable medium having stored thereon program instructions that when executed by the processor cause the computing device to perform a set of functions comprising:
accessing a first list that includes ordered clip identifiers $C_1 \ldots C_n$;
accessing a second list that includes ordered player identifiers $P_1 \ldots P_x$, wherein x<n, and wherein x and n are integers;
determining that a clip identifier $C_m$ of the clip identifiers $C_1 \ldots C_n$ is restricted to being assigned a player identifier $P_z$ from the player identifiers $P_1 \ldots P_x$;
making a first determination that a clip identifier $C_p$ is a next one of the clip identifiers $C_1 \ldots C_n$ after the clip identifier $C_m$ to have a player-identifier assignment-restriction;
responsive to making the first determination, (i) determining that the clip identifier $C_p$ is restricted to being assigned a player identifier $P_y$ from the player identifiers $P_1 \ldots P_x$, (ii) matching with each clip identifier $C_{m+1} \ldots C_p$ in reverse order a respective one of the player identifiers $P_1 \ldots P_x$ selected in a reverse ordered and looping fashion starting with the player identifier $P_y$;
making a second determination that the clip identifier $C_{m+1}$ has been matched with the player identifier $P_z$; and
responsive to making the second determination, causing an alert to be output by an output component.

10. The computing device of claim 9, wherein the first list is part of a rundown for a news program.

11. The computing device of claim 10, wherein the set of functions further comprises:
making a third determination that the rundown has been initialized or edited, wherein determining that the clip identifier $C_m$ is restricted to being assigned the player identifier $P_z$ occurs in response to making the third determination.

12. The computing device of claim 9, wherein the first list is part of a traffic schedule for a program broadcast.

13. The computing device of claim 9, wherein each of the player identifiers identifies a respective one of a plurality of players.

14. The computing device of claim 13, wherein the computing device is a first computing device, wherein the plurality of players comprises one of a video player device and a software-based video player executing on a second computing device.

15. The computing device of claim 9, wherein the output component comprises a display screen, and wherein causing the alert to be output comprises causing the display screen to display the alert.

16. The computing device of claim 9, wherein the output component comprises a speaker, and wherein causing the alert to be output comprises causing the speaker to sound the alert.

\* \* \* \* \*